Nov. 24, 1964  F. FISCHER  3,158,029
PRESSURE MEASURING INSTRUMENT FOR HIGH
STATIC PRESSURE ATMOSPHERES
Filed June 7, 1962  4 Sheets-Sheet 1

INVENTOR.
FRANZ FISCHER
BY
Emery Whitmore Sindee & Hahn
ATTORNEYS

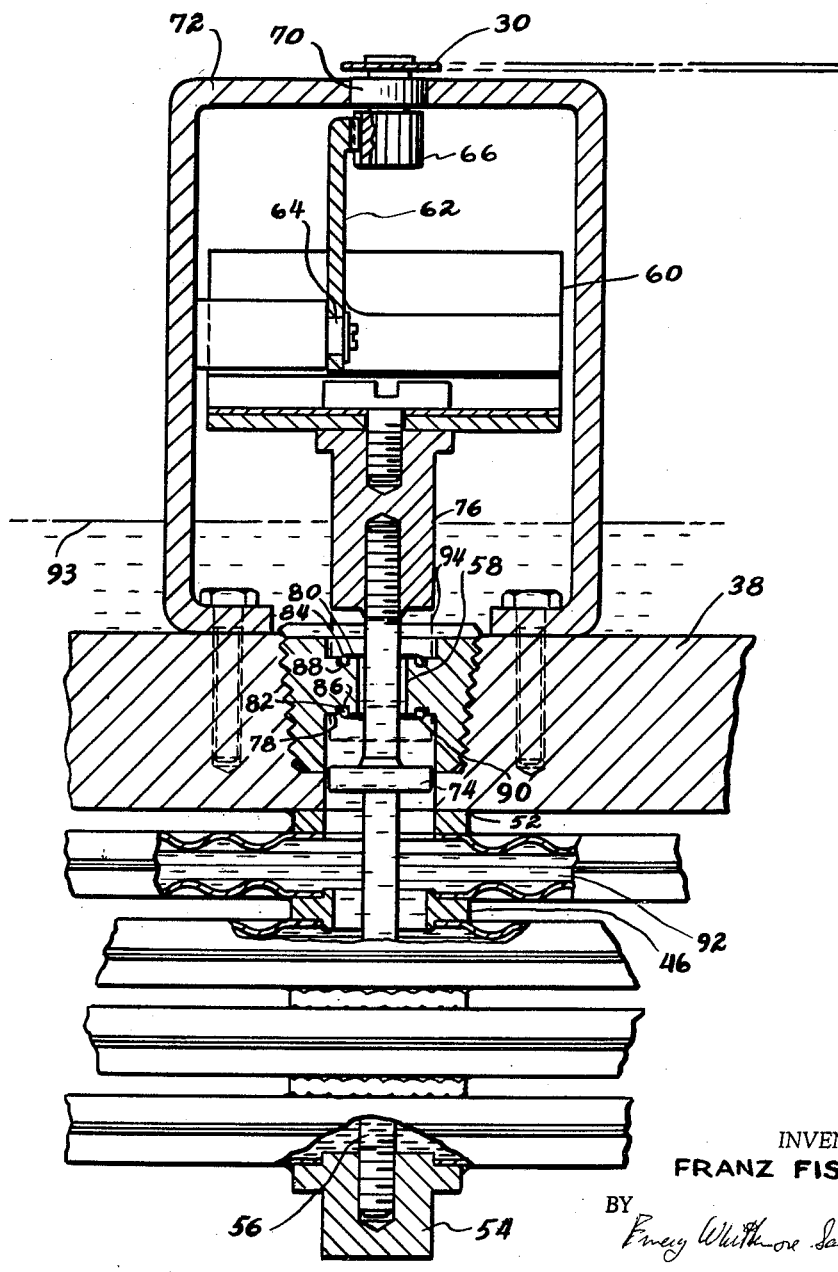

Nov. 24, 1964  F. FISCHER  3,158,029
PRESSURE MEASURING INSTRUMENT FOR HIGH
STATIC PRESSURE ATMOSPHERES
Filed June 7, 1962  4 Sheets-Sheet 3
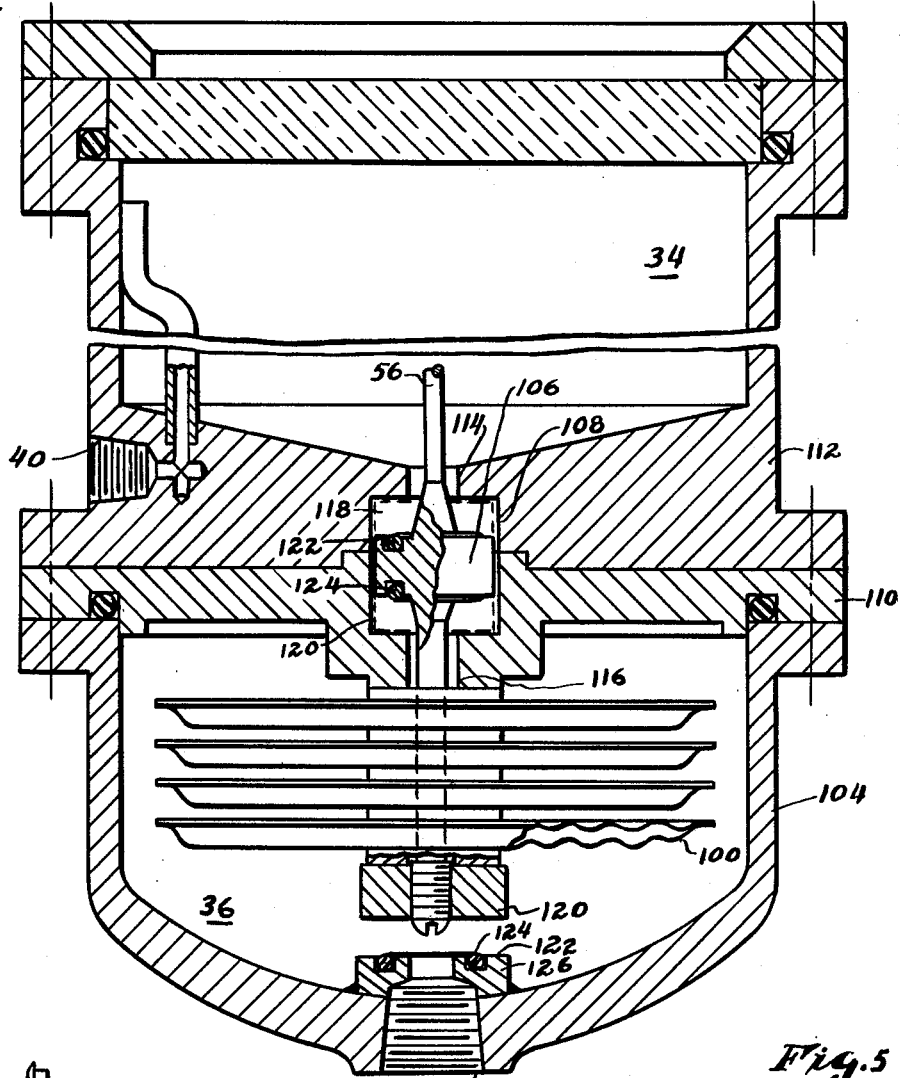
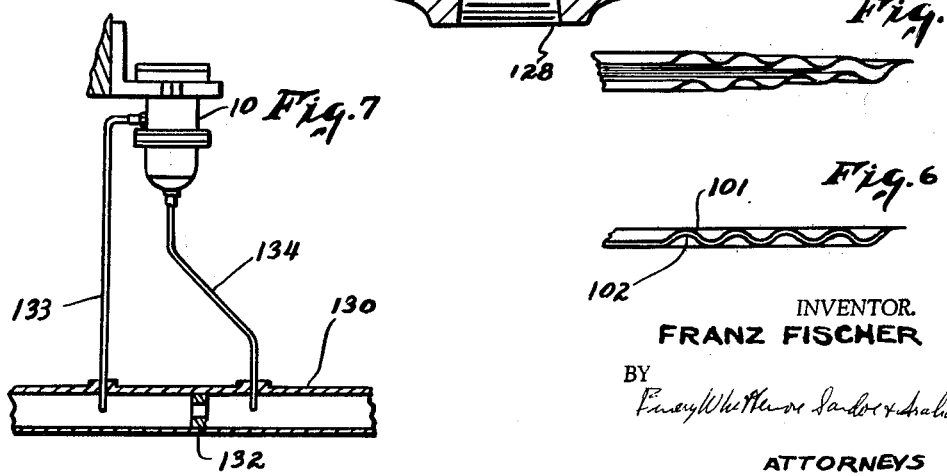
INVENTOR.
FRANZ FISCHER
BY
ATTORNEYS

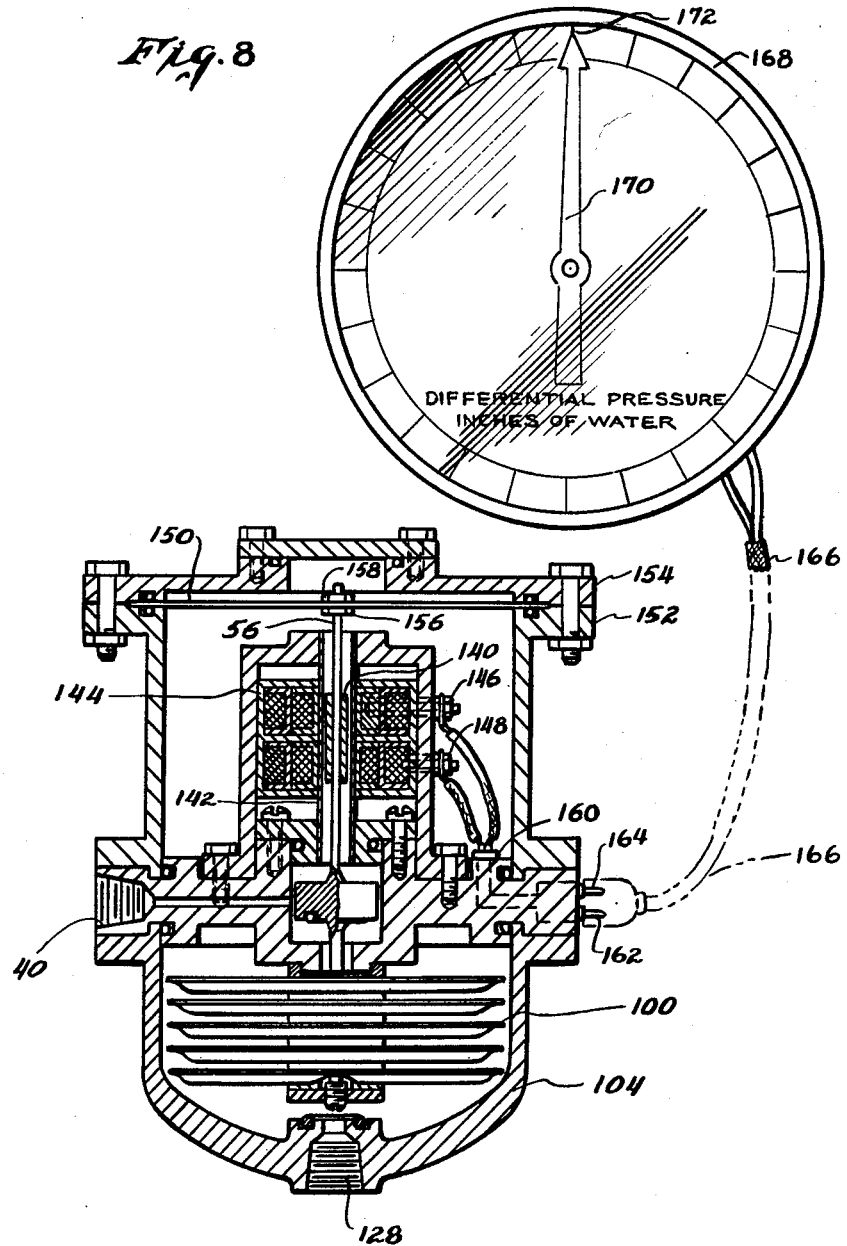

United States Patent Office 3,158,029
Patented Nov. 24, 1964

3,158,029
PRESSURE MEASURING INSTRUMENT FOR HIGH STATIC PRESSURE ATMOSPHERES
Franz Fischer, Port Chester, N.Y., assignor to Melchior International Corporation, New York, N.Y., a Pananamian corporation
Filed June 7, 1962, Ser. No. 200,679
5 Claims. (Cl. 73—407)

This invention relates to pressure instruments and, more particularly, relates to a differential pressure instrument to be utilized in an environment having high static pressure loading.

In many applications, for example, as in pipe lines for transmission of natural gas, it is desirable to measure the gas flow rate by measurement of the differential pressure across a constriction or venturi. The differential pressure in such cases is, of course, relatively low (e.g. of the order of 20 to 50 in. of water) even at the very high flow rates encountered in such environments.

However, the measurement is rendered extremely difficult by virtue of the fact that the static pressure in the line is very high (e.g. of the order of 1000 to 1500 p.s.i. gage). Theoretically, of course, the differential pressure measurement can be made with conventional differential pressure measuring instruments since the static pressure is balanced out on both sides of the instrument. However, in practice, such instruments cannot be used since it is impossible to connect the instrument to the pipe in such manner as to apply the static pressure to each side simultaneously.

Those instruments which have provisions for coupling the instrument are subject to damage in use; for example, should one connection be destroyed or broken, the entire static pressure load will be applied to one side of the instrument, destroying the instrument.

It is, therefore, a primary object of this invention to provide a differential pressure measuring instrument which is provided with protection against destruction by the static pressure application to one side of the instrument alone.

In accordance with these objects, there is provided in a preferred embodiment of this invention, a differential pressure measuring instrument comprising a pressure-tight casing having a central wall dividing the casing into a first and second compartment.

A pressure sensor, which preferably comprises a plurality of differential pressure capsules stacked together, is mounted within the second compartment by affixing one end of the sensor to said dividing wall. The other end of said capsule stack is free to deflect in accordance with the differential between the pressure applied internally and externally of the capsules. A central aperture is provided in the mounting wall providing a communication path between the interior of the capsules and the first of said chambers. An armature which is reciprocated in accordance with capsule deflection passes through the aperture into the first compartment and is coupled to an indicator mounted therein.

The first chamber and second chamber are respectively coupled to pressure sources, the difference therebetween being the desired measurement. For example, the first and second chambers may be coupled respectively to a gas pipe on each side of a constriction or orifice mounted therein. In order to protect the capsules against destruction by overpressure in either direction, a double acting valve is coupled to the armature, which valve acts on valve seats in the aperture coupling the first chamber to the capsule interiors. The capsules are filled with a substantially incompressible fluid such as oil. In addition, a valve to close the capsule chamber on overdeflection of the capsules may be provided. The capsules may then be air actuated without oil filling.

Under normal conditions, the capsules will, thus, measure the difference in pressure in the first and second chamber, which respectively apply pressure to the interior and exterior of the capsules. If the pressure in either chamber changes suddenly at a high rate, the valves will close, preventing the differential pressure from exceeding the working tolerances of the capsule stack and, thus, preventing capsule deflection beyond working limits.

Indicator means are provided to indicate the measured differential pressure over the operating range.

Having briefly described this invention, it will be described in greater detail along with other advantages and objects thereof in the following detailed description, which may best be understood by reference to the accompanying drawings, of which:

FIG. 3 is a cross sectional view taken along lines 3—3 of FIG. 2;

FIG. 4 is a cross sectional view of another embodiment of the present invention;

FIG. 5 is a sectioned view of the capsule shown in FIG. 4 in the expanded position;

FIG. 6 is a cross section view of the capsule shown in FIG. 4 in the collapsed position;

FIG. 7 is a plan of a typical installation of the instrument; and

FIG. 8 is a partially sectioned view of another embodiment of this invention.

Figure 1:
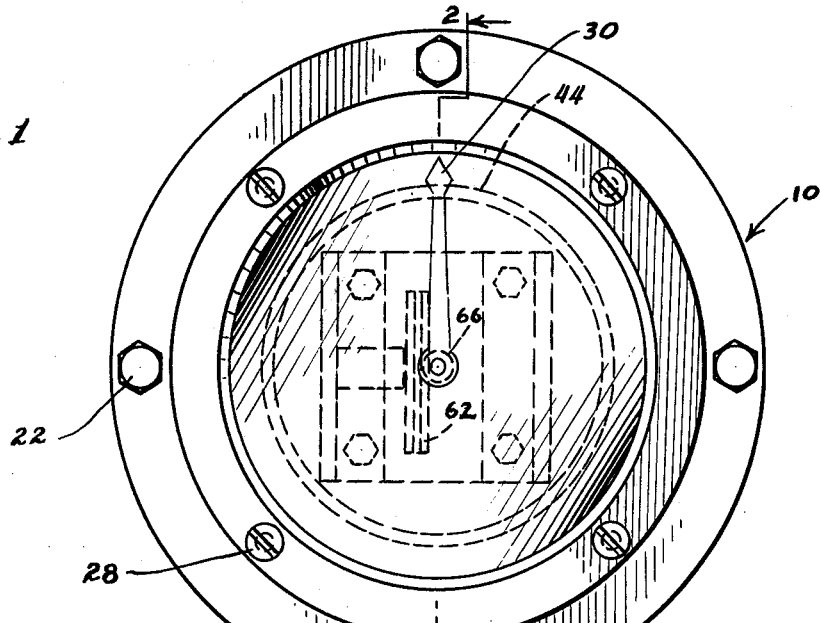
FIG. 1 is a plan view of the face of the instrument constructed in accordance with the present invention.
Figure 2:
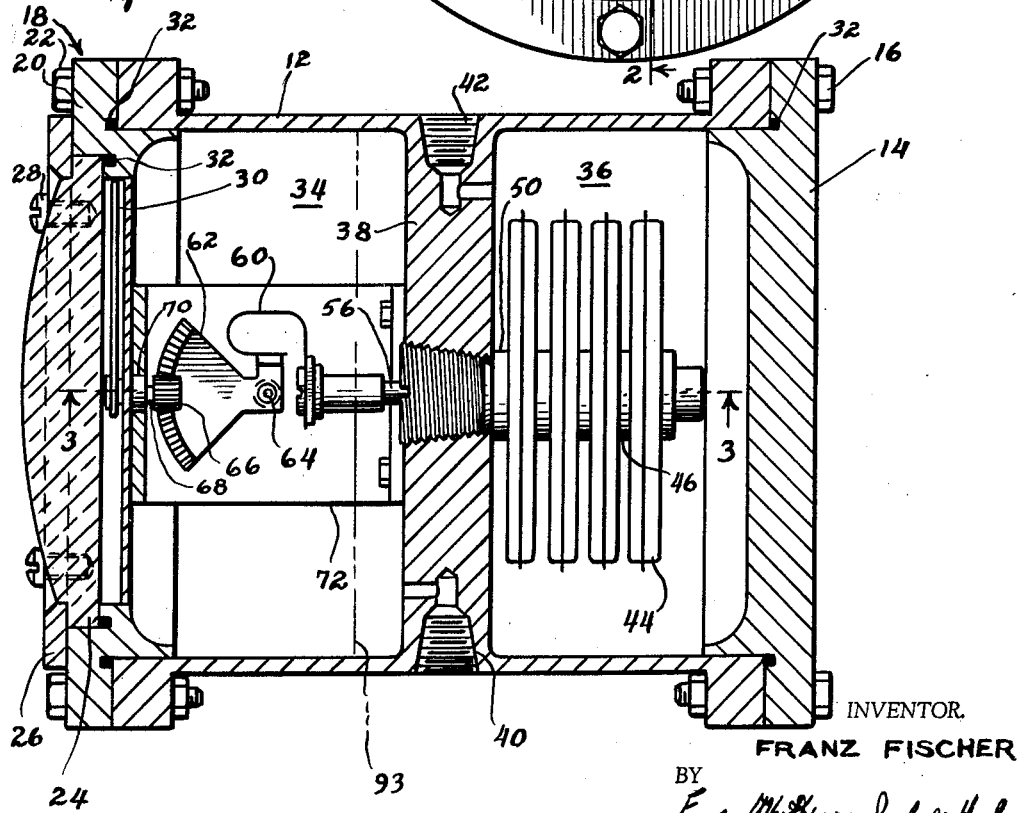
FIG. 2 is a cross sectional view taken along lines 2—2 of FIG. 1.

In FIGS. 1–3, there is shown a differential pressure measuring instrument 10 comprising an outer case 12 which is enclosed into a pressure-tight container by the end cap 14 secured thereto by bolts 16 and an end flange assembly 18. The end flange assembly consists of a peripheral ring 20 secured to the case by bolts 22 within which is mounted a transparent window 24 of thickness of material sufficient to withstand the pressure encountered in the application intended. The window is secured in place by a bezel 26 secured to the peripheral ring by screws 28. In this manner, clear and unobstructed viewing of the indicator 30 may be had. O-rings 32 may be provided for sealing purposes as indicated.

The case is divided into a first and second chamber 34 and 36, respectively, by a dividing wall 38. The instrument is coupled so that chamber 34 is connected via fitting 40 to one source of pressure and chamber 36 is coupled via fitting 42 to a second pressure source. For example, the couplings 40 and 42 may run to each side of a construction or orifice in a gas line for measurement of the flow rates therethrough.

The difference in pressure between chambers 34 and 36 is measured by an array of serially stacked differential pressure capsules 44, coupled together at hubs 46 in conventional manner. The hub 50 of one end of the stack is affixed to the partition 38 as, for example, by welding 52 and aperture 58 which is provided to couple chamber 34 with the capsule interior. The other end of the capsule stack, defined by hub 54, is free to deflect in accordance with the magnitude of the pressure differential between the interior and the exterior of the capsules. An armature rod 56 is threadably coupled to the hub 54 to enable adjustment of the insertion depth and extends through an aperture 58 in the partition 38. The armature will, thus, reciprocate in accordance with capsule stack expansion and contraction. The armature is coupled through a spring flexure 60 to a sector 62 which is pivotably mounted on pivot 64 which, for example, may be a ball bearing. Thus, the linear motion of the armature 56 is translated into sector rotation, which rotation is transmitted to the indicator 30 through pinion 66, the shaft 68 of which is rotatably mounted within bearing 70 in the mounting bracket 72. The indicator may indicate differential pressure or may be calibrated directly in flow rates across known orifices.

Thus, under normal operation, the pressures respectively applied to chambers 34 and 36 will be communicated respectively to the exterior and interior of the capsule (the latter through aperture 58) and the capsule stack will deflect in accordance with the measurement of this differential pressure. In order to protect the capsule from overload in each direction of deflection, there is provided a valve defined by the plungers 74 and 76 which cooperate with the valve seats 78 and 80, respectively at each end of the stroke. O-rings 82 and 84 are recessed within annular grooves 86, 88 respectively to sealingly cooperate with the plungers 74 and 76. Sinking of the O-rings within the grooves prevents crushing of the O-rings. Thus, for example, should the pressure on the exterior of the capsule build up beyond the working differential, the plunger 74 will reach the position shown as in the dotted outline 90 closing the annular aperture 58. Similarly, the plunger 76 will seal the aperture in the other direction.

While this double acting valve will cooperate to prevent working beyond the design pressure range, it is necessary to provide protection against capsule destruction when the entire static pressure is applied to one chamber. For this purpose, the capsules are filled with oil as indicated by lines 92. The oil is filled to level 93 to ensure a reservoir supply. The capsules are mounted in the horizontal plane; that is, the capsule stack axis is vertical so that the capsules will be filled with oil.

Thus, for example, should the chambers 34 and 36 be connected to an atmosphere of high static pressure (e.g. 1000–1500 p.s.i. gage), sudden pressure release from one chamber (for example, caused by rupture of one of the coupling lines) will not cause capsule destruction. For example, if compartment 34 is suddenly reduced to atmospheric pressure, the plunger 74 will move to the sealed position 90, preventing the escape of oil from within the capsules. The pressure applied in chamber 36 will, therefore, be resisted by the oil within each capsule which will build up to a corresponding pressure by a small capsule deflection. Thus, the capsules themselves will not be deflected beyond the design limits and, upon recoupling of chamber 34 to the pressure, the instrument will return to normal operation.

Similarly, should the chamber 36 be reduced to atmospheric pressure while chamber 34 is maintained at 1000 p.s.i., the plunger 76 will move to the position shown at 94, closing the aperture 58. The capsules will expand slightly until the hydrostatic pressure of the encased oil 92 is reduced to atmospheric pressure. The reduction of the pressure within the capsules will occur with but an imperceptible expansion of the capsules after closure of aperture 58 due to the substantially incompressible characteristics of oil.

It will be noted that the chamber 34 is provided to house the indicator mechanism and to provide a means for coupling the pressure to the capsule interior. If the indicator mechanism is replaced by another type such as a null balance tracking of a ferromagnetic slug on the sensor or magnetic tracking of a magnet on the stack by an external element (e.g. a helical external magnet), the chamber 34 may be reduced in size or eliminated completely by coupling the pressure directly to the aperture 58.

If the capsules were filled with air, the closure of aperture 58 would not prevent capsule destruction since the capsules would house gas under the static pressure at the time of closure, which gas would expand to rupture or overstress the capsules. In such application, the embodiment shown in FIG. 4 may advantageously be employed.

In FIG. 4, there is shown another embodiment of the present invention which is constructed in similar fashion to that shown in FIGS. 1–3, having a chamber 34 and a chamber 36 to which is respectively coupled the lines for measurement of the differential pressure therebetween. The capsules 100 illustrated, however, are of the nesting type in which the corrugations of the capsule diaphragms are mated. Thus, as the capsule contracts or collapses as is shown in FIG. 6, the corrugations 101, 102 thereof will nest. This nesting provides a substantial amount of self-supporting characteristics to prevent capsule distortion even under complete collapse of the capsules.

The other differences are constituted by the definition of chamber 36 by a dome 104 and a modified valve assembly having a piston assembly 106 operating within a cylinder 108 defined within the plate 110 and the chamber wall 112. Apertures 114 and 116 are provided to allow communication between the chamber 34 and the interior of the capsules. The piston 106 restricts the capsule stroke by closing the communication between chamber 34 and the interior of the capsule at each end of the stroke illustrated in dotted outline as 118 and 120 in which positions O-rings 122 and 124 sealingly engage the piston 106. The armature 56 may be coupled to an indicator as shown in FIGS. 1–3.

The capsules may be filled with a fluid such as oil and the instrument would then operate as explained in connection with the instrument of FIGS. 1–3. However, in some applications, it is desirable to avoid the use of oil in the capsules.

When the capsule interior is filled with a compressible, gaseous atmosphere, however, additional protection must be accorded. For this purpose, the hub 120 is developed as a sealing plunger to engage the seat 122 and sealing O-ring 124 developed on boss 126 around the fitting 128.

Thus, if the line to fitting 128 is broken, the plunger 120 will seal the fitting aperture 128, maintaining pressure within the dome 104. This pressure supports the capsules. Of course, the capsules may be filled with oil even when the valve 120, 122 is provided. In such case, the valve serves as additional protection against the unlikely event that the instrument is turned upside down (allowing the oil to run out of the capsules) and then the line to fitting 128 is broken.

In the event of removal of the line to fitting 128, the capsules will remain in the expanded position due to the seal of O-ring 124 until the sensor was mechanically displaced as, for example, by a tool inserted through fitting 128. For removal of the instrument, the line to chamber 34 is uncoupled before the line to chamber 36 to prevent locking. The sensor may be rendered self bleeding by removing the sealing O-ring 124 in those applications where a pressure surge into chamber 34 with fitting 128 open is not a factor against which protection is needed. Similarly, O-ring 122 may be removed in those applications where the capsules are sufficiently precise to nest as shown in FIG. 6 without undue stressing of the capsules. The protection of the nesting capsules against damage on collapse is, thus, utilized.

In FIG. 7, there is shown a typical installation of the instrument 10 which is mounted in the vertical position with the dial and indicator 30 at the top thereof. The pipe line 130 which carries the gas at the high static pressure is provided with a constriction 132 and a pressure line is coupled between one side of the constriction and chamber 34 via coupling 133, the other side of the constriction being coupled to chamber 136 by means of coupling pipe 134.

Thus, it can be seen that the instrument may be uncoupled from the installation without fear of ruining the instrument. Similarly, should one of the coupling lines become damaged or ruptured, the instrument will be protected. Vertical mounting is necessary with the oil filled capsule to ensure that the capsules remain filled with oil. Although any substantially incompressible fluid can be used, I prefer to use a silicon oil due to the relatively inert chemical characteristics.

In many applications, it may be desirable to provide a readout suitable for remote reading. In such applications, the embodiment shown in FIG. 8 may advantageously be employed.

In FIG. 8, there is shown a pressure measuring instrument of essentially the same configuration as that shown in FIG. 4 and in which case like parts have been given identical reference numerals. The differential pressures are applied via the apertures 128 and 40. The armature 56, however, carries a ferromagnetic slug 140 mounted thereon. Positioned concentrically about the tube 142 in which the slug 140 is reciprocally driven is a balanced transformer 144 consisting of balanced primary and secondary windings. The secondary windings are connected in series opposition. Thus, when the armature is centered between the halves of the transformer, the output from the secondary windings cancels and the total transformer output is zero. The secondary windings are coupled to terminals 146 and 148.

When the slug 140 is centered within the transformer, it is at a position generating an output of zero amplitude, hereinafter referred to as the null position. Movement of the slug from this null position will unbalance the transformer thereby to generate an output signal which will vary in phase dependent upon the direction of deflection from the null position and will vary in amplitude in accordance with the magnitude of the deflection from the null position.

Since the positioning of the slug affects the flux linkage between the primary and secondary windings, it must be held in a centrally located position despite the influence of external forces such as acceleration forces thereon. For this purpose, there is provided a spider spring 150 clamped at the periphery thereof between the housing 152 and the cover plate 154. The armature is coupled thereto by means of the nuts 156 and 158 which are tightened on the hub of the spider spring. The output signal is transmitted through a pressure-tight seal 160 to output terminals 162, 164 and may then be transmitted over suitable cabling 166 to an output indicator 168. The output indicator is provided with a pointer 170. Preferably, the output indicator is a phase sensitive voltmeter which may require additional, but conventional circuitry for phase sensing so that the needle will deflect from a null indication 172 dependent upon the direction of movement. Alternatively, the null position may be selected as the maximum deflection in one direction so as to indicate armature travel in terms of signal amplitude alone. In this case, the indicator need merely be an amplitude sensitive A.C. voltmeter.

This invention may be variously modified and embodied within the scope of the subjoined claims.

What is claimed is:

1. A differential pressure measuring instrument for measuring relatively small differences between first and second high static pressure comprising: a case having a first and second pressure chamber, a common wall separating said first and second chamber and defining said chamber and having an aperture extending therethrough, a plurality of differential pressure measuring capsules, said capsules being stacked and mounted in said second pressure chamber, said stacked capsules being mounted on said wall separating said first and second chambers and enclosing said aperture so that said aperture communicates between said first chamber and the interior of said stacked capsules, a first fitting in the wall of said first chamber to couple said first static pressure to said first chamber to apply said first static pressure to the interior of said stacked capsules through said first chamber and said aperture in said wall, a second fitting in said second chamber to couple said second static pressure to said second chamber and to apply said second static pressure to the exterior of said stacked capsules, indicator means coupled to said stacked capsules to indicate movement of the unmounted end of the capsule stack as the stacked capsules expand and contract in response to differences between said first and second pressures applied respectively to the interior and exterior of said capsules, a first valve coupled to the unmounted end of the capsule stack to seal said aperture when the capsule stack has expanded to the designed limit of expansion, and a second valve coupled to the unmounted end of the capsule stack to engage said second fitting to seal said second chamber against pressure loss when said capsules have expanded to the designed limit of expansion, said sealing of said aperture and said second fitting occurring substantially simultaneously so that, on sudden reduction of static pressure applied to the second chamber, the difference in pressure applied to the interior and exterior of said stacked capsule will not exceed the pressure differential for which the capsules are designed.

2. A differential pressure measuring instrument in accordance with claim 1 in which said capsules are nesting capsules.

3. A differential pressure measuring capsule in accordance with claim 1 which includes a third valve coupled to the unmounted end of said capsule stack to seal said aperture as said capsules contract to the limit of the designed stroke, so that, on sudden reduction of the pressure applied to said first chamber, the difference in pressure applied to the interior and exterior of the stacked capsules will not exceed the pressure differential for which the capsules are designed.

4. A differential pressure measuring instrument for measuring relatively small differences between a first and second high static pressure comprising a first and second static pressure chamber, a first fitting in the wall of said first chamber to couple said first static pressure to said first chamber, a second fitting in the wall of said second chamber to couple said second static pressure to said second chamber, a common wall separating said first and second chambers for defining said chambers and having an aperture extending therethrough, said aperture having a cylindrical enlarged portion within said common wall, a plurality of differential pressure measuring capsules, each of said capsules being provided with hubs, said capsules being coupled together at said hubs in a capsule stack, said capsule stack being mounted within said second pressure chamber, the hub at one end of said stack being affixed to said common wall, and enclosing said aperture so that said aperture communicates between said first chamber and the interior of said stacked capsules, the hub at the other end of said capsule stack being developed as a sealing plunger enclosing said capsule stack, an armature rod coupled to said sealing plunger and extending through the capsule stack and through said aperture into said first chamber, said armature rod deflecting with deflection of said capsule stack, indicator means coupled to said armature rod to indicate the amount of movement of the unmounted end of said capsule stack as the stacked capsules expand and contract in response to differences between said first and second pressures, said armature rod being provided with a piston affixed thereto and positioned within said cylindrical portion of said aperture, an O-ring positioned on one face of said piston to seal said aperture when the capsule stack has expanded to the designed limit of expansion, said sealing plunger engaging said second fitting to seal off said second fiting when the capsule stack has expanded to the designed limit of expansion, said sealing plunger sealing off said second fitting substantially simultaneously with the sealing of said aperture by the O-ring positioned on said one face of said piston to maintain the difference in pressure applied to the interior and exterior of said stacked capsules below the pressure differential for which the capsules are designed, and a second O-ring positioned on the other face of said piston to seal said aperture when the capsules have contracted to their designed limit, thereby to maintain pressure within said capsule, preventing the differential pressure on the interior and exterior of said capsule from exceeding that for which the capsules are designed.

5. A differential pressure measuring instrument for measuring relatively small differences between a first and second high static pressure comprising: a case, said case including a wall defining a pressure chamber, said wall having an aperture extending therethrough, a pressure sensor mounted in said chamber, said sensor consisting of at least one differential pressure measuring capsule mounted on said wall and enclosing said aperture, a first fitting in said casing to apply said first static pressure through said aperture to the interior of said capsule, a second fitting in said casing to apply said second static pressure to the exterior of said capsule, indicator means coupled to said capsule to indicate movement of the unmounted end of the capsule as the capsule expands and contracts in response to differences between said first and second pressures applied respectively to the interior and exterior of said capsule, a first valve coupled to the unmounted end of said capsule to seal said aperture when the capsule has expanded to the designed limit of expansion, and a second valve coupled to the unmounted end of said capsule to engage said second fitting to seal said pressure chamber against pressure loss when said capsule has expanded to the designed limit of expansion, said sealing of said aperture and said second fitting occurring substantially simultaneously so that on sudden reduction of static pressure applied to said pressure chamber, the difference in pressure applied to the interior and exterior of said capsule will not exceed the pressure differential for which the capsules are designed.

References Cited in the file of this patent

UNITED STATES PATENTS

| | | |
|---|---|---|
| 2,058,858 | Fetyko | Oct. 27, 1936 |
| 2,442,722 | Davis | June 1, 1948 |
| 2,627,750 | Titus | Feb. 10, 1953 |
| 2,659,390 | MacLea | Nov. 17, 1953 |
| 2,857,495 | Bourns et al. | Oct. 21, 1958 |
| 2,945,510 | Jones | July 19, 1960 |
| 3,047,022 | Aldinger | July 31, 1962 |
| 3,050,085 | Reese | Aug. 21, 1962 |
| 3,068,700 | Bourns | Dec. 18, 1962 |

FOREIGN PATENTS

| | | |
|---|---|---|
| 389,157 | Germany | Feb. 1, 1924 |